United States Patent [19]
Koizumi et al.

[11] 3,905,128
[45] Sept. 16, 1975

[54] TEACHING SYSTEM

[75] Inventors: Masami Koizumi, Yokohama; Satoshi Yamauchi, Tokyo, both of Japan

[73] Assignee: Ricoh Co., Ltd., Tokyo, Japan

[22] Filed: Oct. 4, 1973

[21] Appl. No.: 403,403

[30] Foreign Application Priority Data
Oct. 12, 1972  Japan............................ 47-102021

[52] U.S. Cl....................... 35/8 A; 35/9 A; 35/48 R
[51] Int. Cl.²........................................... G09B 7/00
[58] Field of Search............. 35/8 A, 8 R, 9 A, 9 R, 35/9 B, 35 C, 35 B, 48 R; 360/107

[56] References Cited
UNITED STATES PATENTS

| | | | |
|---|---|---|---|
| 3,210,864 | 10/1965 | Tillotson et al. | 35/9 A |
| 3,322,427 | 5/1967 | Fujimoto | 360/107 X |
| 3,501,851 | 3/1970 | Price et al. | 35/9 A |
| 3,660,912 | 5/1972 | Laplume | 35/9 A |
| 3,664,037 | 5/1972 | Budnik et al. | 35/9 A |
| 3,748,754 | 7/1973 | Laberge | 35/48 R |

*Primary Examiner*—Robert W. Michell
*Assistant Examiner*—Vance Y. Hum
*Attorney, Agent, or Firm*—Cooper, Dunham, Clark, Griffin & Moran

[57] ABSTRACT

A teaching system in which a question signal recorded on a recording medium such as a magnetic tape or magnetic sheet is reproduced in a play-back unit, the student answers it by manipulating the play-back unit, the system compares the student answer with a correct answer signal reproduced from the recording medium, and indicates the result of the comparison to be student. The device by which a student provides an answer may be automatically reset a fixed time after the question is reproduced. Additionally, each question may be accompanied by a recorded indication of how much time a student should take to answer it, and a comparison may be made of the allowed versus the actual answer time, and the comparison result may be displayed.

8 Claims, 10 Drawing Figures

TEACHING SYSTEM

BACKGROUND OF THE INVENTION

This invention relates to a teaching system in which signals recorded on a recording medium such as magnetic tape or magnetic sheet are reproduced to assist in the learning.

Heretofore, teaching systems of this kind used a magnetic recording medium such as a magnetic tape or magnetic sheet on which a plurality of sets of signals are recorded in sequence, each set comprising a question signal, a stop signal and an explanation signal arranged in sequential order. In such a system, a student sets up the recording medium on a magnetic play-back unit and operates it for play-back to reproduce a question signal recorded on the recording medium as a sound. When the play-back unit detects a stop signal from the recording medium, it is automatically stopped. The student endeavours at obtaining an answer for the question signal reproduced in the form of a sound, and subsequently manipulates the play-back unit for play-back to reproduce the explanation signal. In this manner, the question signal and the explanation signal recorded on the recording medium are reproduced by a manipulation of the student to supply teaching materials to assist in the learning of the student. However, such a teaching system involves a disadvantage of low effectiveness of teaching in that the psychological stimulus to the student is diminished because he is not informed of whether or not his answer was correct.

SUMMARY OF THE INVENTION

An object of the invention to provide a teaching system which is simple in arrangement and capable of increasing the teaching effect by affording an increased psychological effect to a student by comparing a correct answer signal detected from a recording medium and a student answer entered by an answer manipulation and by indicating the result of the comparison to the student.

Another object is to automatically reset the device by which a student provides his answer a fixed time after the corresponding question is reproduced.

Still another object is to measure the time a student takes to provide an answer, to compare it with a recorded allowable time for that question, and to indicate how and by how much the actual answer time differs from the allowed time.

BRIEF DESCRIPTION OF THE DRAWINGS

FIGS. 1 (a) and (b) and FIGS. 2 (a) and (b) are charts showing examples of signals recorded on magnetic sheets used in the invention and the timing of certain operations involved in carrying out the invention;

FIG. 3 (3) is a bottom view of an exemplary magnetic sheet used in the invention;

FIG. 3 (b) is a perspective view of an exemplary magnetic play-back unit;

DETAILED DESCRIPTION

Figure 1A:
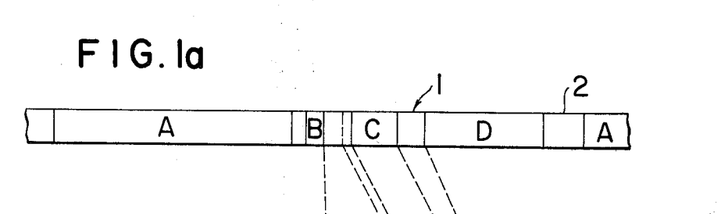
Figure 3A:
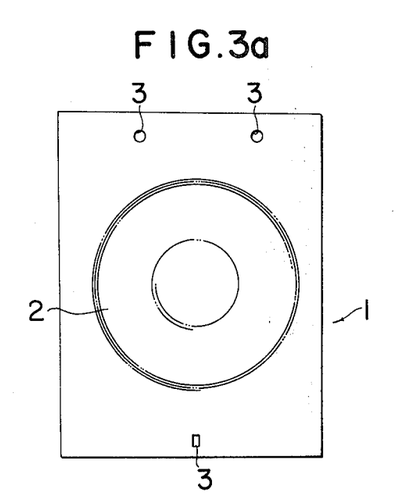

In FIG. 1 (a), there is shown a recording medium 1 having a recording track 2 in which are recorded a plurality of teaching subjects in sequence, each subject comprising a set of a question signal A, a stop signal B, a correct answer signal C for the question signal A, and an explanation signal D for the question signal A, all arranged in a sequential manner. In the embodiment shown, the recording medium 1 comprises a magnetic sheet as illustrated in FIG. 3 (a), but it should be understood that a magnetic tape may be used as well. The magnetic sheet 1 is formed with a recording track 2 on its rear surface in a spiral form, and is also formed with apertures 3 therein. Where a drawing is utilized for a particular teaching subject, for example, in order to present a question to a student, such a drawing may be drawn on the front surface of the magnetic sheet 1.

Figure 3B:
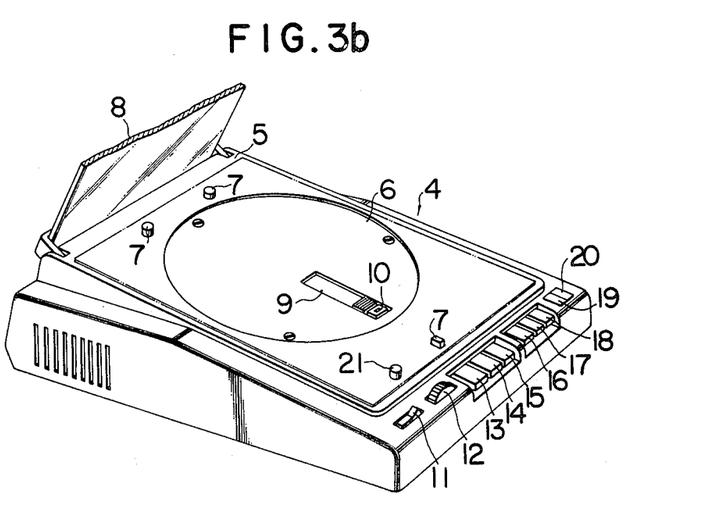

The magnetc sheet 1 is adapted to be mounted on a magnetic play-back unit 4, which is of the spiral track type. Examples of units of this type are given in U.S. Pat. Nos. 3,046,357 and 3,322,427. The unit 4 has an upper panel 5, in the central region of which is provided an opening, and on which a turntable 6 is rotatably mounted. Tabs 7 for attaching the magnetic sheet 1 are formed on the upper panel 5, and a transparent cover 8 is pivotally mounted thereon to cover the upper panel 5. The turntable 6 is formed with a radially extending slit 9, into which a magnetic head 10 protrudes. The magnetic head 10 is adapted to rotate together with the turntable 6, and is also translatable along the slit 9. At its front end, the magnetic play-back unit 4 is provided with a power switch 11, volume control 12, rapid feed button 13, play-back button 14, rewind button 15, answer buttons 16 to 18, correct answer indicator lamp 19 and wrong answer indicator lamp 20. A safety switch 21 is provided on the upper panel 5 so as to be operated by the weight of the cover 8. The magnetic sheet 1 is mounted on the upper panel 5 by engaging the apertures 3 with the tabs 7. When the cover 8 is turned over the magnetic sheet 1, the weight of the cover 8 operates the safety switch 21 to enable the volume control 12, rapid feed button 13, play-back button 14, rewind button 15, answer buttons 16 to 18, correct answer indicator lamp 19 and wrong answer indicator lamp 20, thus rendering these elements operative when the power switch 11 is turned on. When the play-back button 14 is turned on in this condition for the purpose of play-back operation, the magnetic head 10 rotates together with the turntable 6 and also moves toward the center of the turntable 6 along the slit 9, thereby tracking the recording track 2 on the rear surface of the magnetic sheet 1 and reproducing the signal recorded thereon.

Figure 1B:
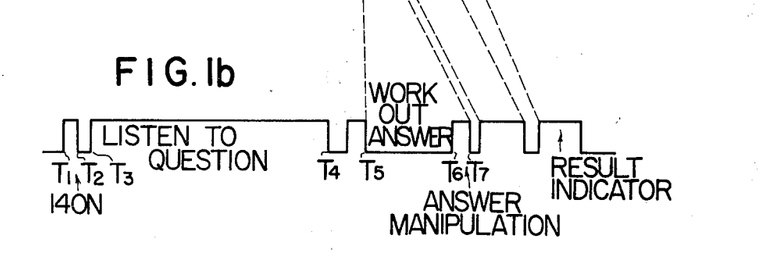

An embodiment of the invention will be described with reference to FIG. 4 together with FIGS. 1 and 3. When the play-back button 14 is manually depressed for a time interval from time $T_1$ to $T_2$ to lock it, the magnetic head 10 initially detects a question signal A recorded on the recording track 2 of the magnetic sheet 1, and converts it into an electrical signal, which is amplified by an amplifier 22 to be applied to a head receiver 23 for conversion into a sound. It will be understood that the head receiver 23 may be replaced by a loud-speaker. The sound from the head receiver 23 is given during the interval $T_3$ to $T_4$ when the magnetic head 10 continues to detect the question signal A, and a student listens to the question thus presented. Where a drawing is given on the front surface of the magnetic sheet 1, he can work out an answer to the question while observing it. After the magnetic head 10 has detected the question signal A from the magnetic sheet 1, it detects a stop signal B. This stop signal B is amplified by the amplifier 22 before being detected by a stop signal detector 24. The output signal from the stop signal detector 24 is applied to a momentary stop mechanism 25, which operates to stop the play-back operation of the unit 4 at time $T_5$. Subsequently, the student works out an answer to the question presented, and when he manipulates either one of the answer buttons 16 to 18 included in an answer device 26 at time $T_6$ to $T_7$, the answer device 26 produces an answer signal which corresponds to such answer manipulation. The answer signal is applied to the momentary stop mechanism 25 to reset it, whereby the play-back operation by the unit 4 is resumed. Then the magnetic head 10 detects a correct answer signal C from the recording track 2, and this signal is amplified by the amplifier 22 and is detected by a correct answer signal detector 27. Where the question signal A is presented in a form that demands a choice of one out of a plurality of given answers, the plurality of answers may be suitably numbered so as to correspond to selected frequencies, for example, 70 Hz, 80 Hz and 90 Hz, and a signal having a frequency corresponding to the number of a correct answer may be recorded as a correct answer signal on the magnetic sheet 1. Alternatively, the number of answers may correspond to different digital signals, and a digital signal corresponding to the number of a correct answer recorded as a correct answer signal on the magnetic sheet 1. The correct answer signal C detected by the correct answer signal detector 27 and the answer signal from the answer device 26 are applied to a coincidence circuit 28 for the purpose of comparison. When the answer made by the student is correct, the output signal from the coincidence circuit 28 turns on a correct answer indicator 19, indicating to that effect. The output signal from the coincidence circuit 28 is also applied to a wrong answer indicator 20 through a negation circuit 30 to turn on the indicator 20 and thus provide an indication of the fact that the answer made by the student is wrong when the inputs to the coincidence circuit 28 differ from each other. Subsequently, the magnetic head 10 detects an explanation signal D from the recording track 2, and this explanation signal D is amplified by the amplifier 22 before being converted into a sound by the head receiver 23. The explanation signal helps the student in providing him with information on how the question should be considered, and does not include the solution to that question. Subsequently, the magnetic head 10 detects the next question signal from the recording track, and the above described procedure is successively repeated for the respective teaching subjects.

Figure 4:
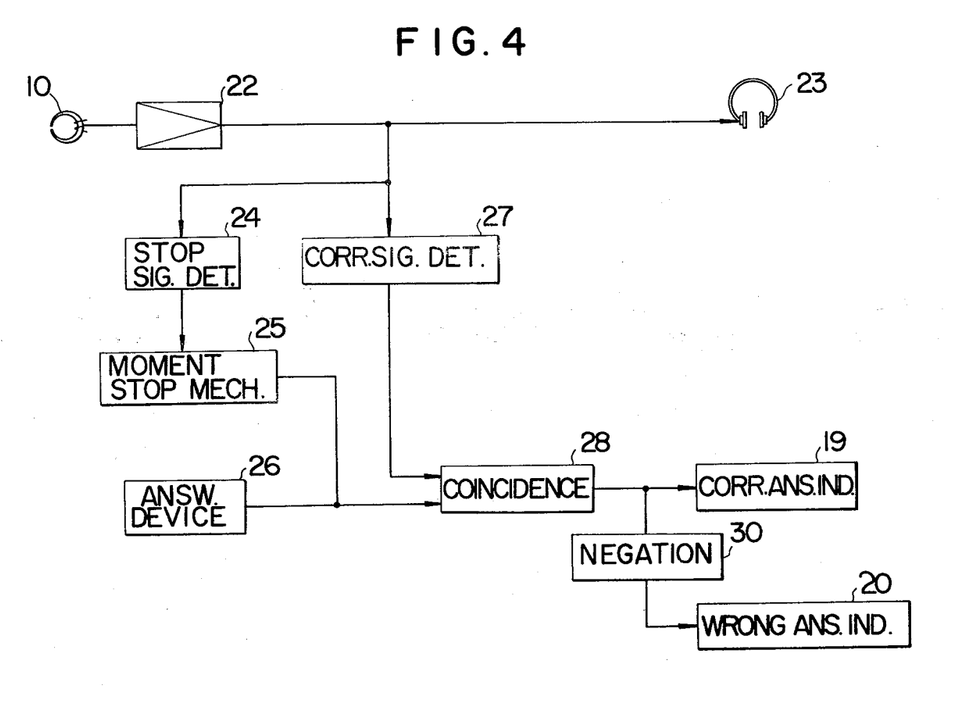
FIG. 4 is a schematic diagram illustrating one embodiment of the teaching system according to the invention.
Figure 5:
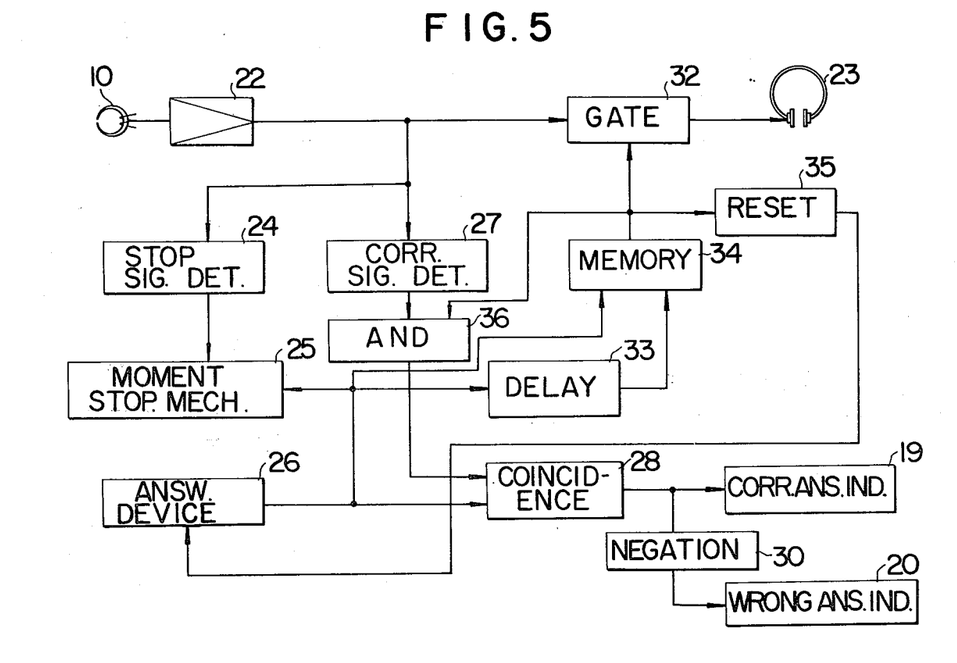
FIG. 5 is a schematic diagram showing a modification of the FIG. 4 embodiment.

FIG. 5 shows a modification of the embodiment shown in FIG. 4, and corresponding parts are designated by similar reference numerals. In the FIG. 5 embodiment, the answer device 26 is automatically reset a predetermined time interval after the student manipulates one of the answer buttons 16–18 to provide an answer to the question A. Specifically, the output signal from the amplifier 22 is applied to the head receiver 23 through a gate circuit 32. When an answer manipulation is effected in the answer device 26, the latter produces a corresponding answer signal, which is applied to a delay circuit 33 and to a memory circuit 34, thereby setting the latter. The output signal from the memory circuit 34 is applied to a reset circuit 35 and the gate circuit 32, which is closed in response thereto. The output signal from the memory circuit 34 is also applied to an AND circuit 36, whereby the output signal from the correct answer signal detector 27 is passed therethrough to be aapplied to the coincidence circuit 28. The output signal of the delay circuit 33 is applied to the memory circuit 34 to reset it. In response to resetting of the memory 34 by the delay 33, the reset circuit 35 applies a reset signal to the answer device 26 to reset it. For practical purposes, the gate circuit 32 may be eliminated. The remainder of the circuit shown in FIG. 5 is similar in operation to that described in connection with the previous embodiment, and therefore will not be repeated. Thus, the answering device 26 is reset a fixed time interval after the question, this time interval being determined by the characteristics of the delay 33.

Figure 6:
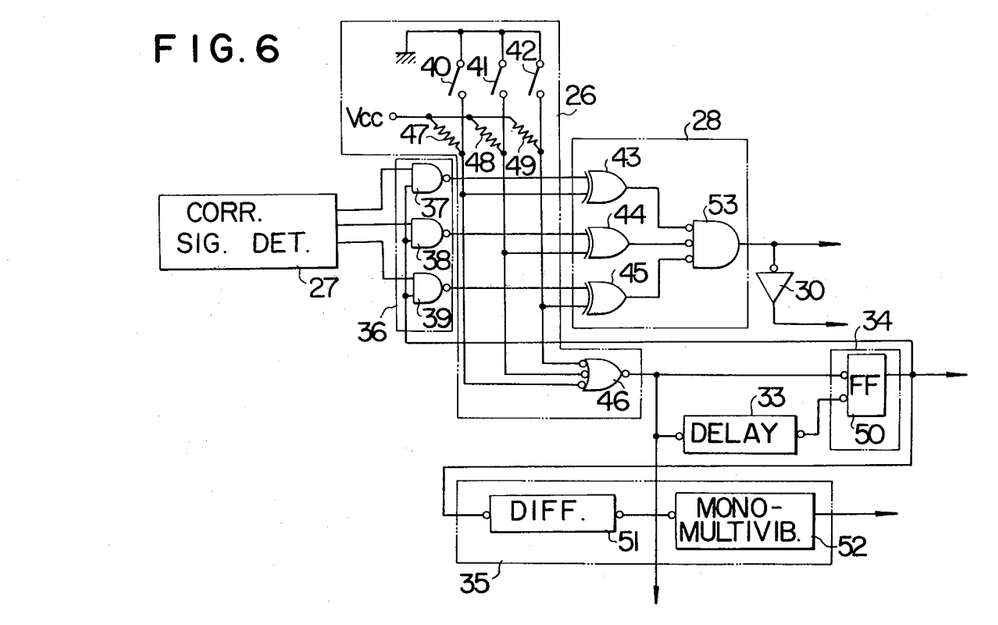
FIG. 6 is a specific circuit diagram for a part of FIG. 5.

A specific circuit of a principal part of the embodiment shown in FIG. 5 is illustrated in FIG. 6. Before describing the operation of the circuit shown, it is assumed that the question signal A recorded on the magnetic sheet 1 requires that the student choose the number of that one of a plurality of given answers which he considers to be correct, and that such number of an answer corresponds to one of selected frequencies $F_1$ to $F_3$ which has weights scaled according to a binary system, and a correct answer signal C is recorded on the magnetic sheet 1 as a frequency or frequencies corresponding to the binary representation of the number of a correct answer signal. The correct answer signal detector 27 includes a plurality of bandpass filters (not shown) which operate to derive components having the frequencies $F_1$ to $F_3$ separately from the output signal of the amplifier 22. These components are applied to NAND circuits 37 to 39, respectively. The answer device 26 includes lock-in switches 40 to 42 which have weights scaled according to a binary system. When a push button corresponding to the number of a given answer which the student considers correct is depressed, the switches 40 to 42 are operated in a combination which gives a binary representation of the number. One terminal of the switches 40 to 42 is connected to the ground, while the other end is connected to one terminal of respective exclusive OR circuits 43 to 45 and one terminal of NOR circuit 46 as well as to a direct current source $V_{cc}$ through separate resistors 47 to 49. When any one of switches 40 to 42 is closed by an answer manipulation, there will be an output signal from the NOR circuit 46, which is applied to the momentary stop mechanism 25, delay circuit 33 and flipflop 50, thereby setting the flipflop 50. The output of the flipflop 50 is passed through a differentiator 51 to a monostable multivibrator 52 and is also applied to the other input of the NAND circuits 37 to 39. As a consequence, the components having the frequencies $F_1$ to $F_3$ derived from the bandpass filters 27 are passed through the NAND circuits 37 to 39 to be applied to the other input of the respective exclusive OR circuits 43 to 45. At the same time, the answer signal produced by the actuation of one of the switches 40 to 42 is applied to one of the exclusive OR circuits 43 to 45, whereby the both signals are compared on bit-by-bit basis. The outputs of the exclusive OR circuits 43 to 45 are connected with the three inputs of a NAND circuit 53, the output signal of which is applied to the correct answer indicator 19 directly and also to the wrong answer indicator 20 through the negation circuit 30. The output signal of the delay circuit 33 is applied to the flipflop to reset it, whereupon the output signal from the monostable multivibrator 52 is applied to the switches 40 to 42 to reset any of these switches which has been operated.

Figure 2A:
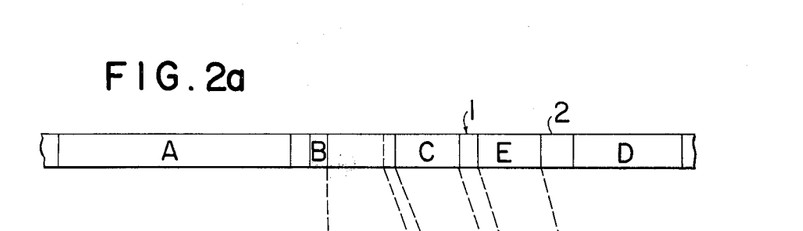
Figure 2B:
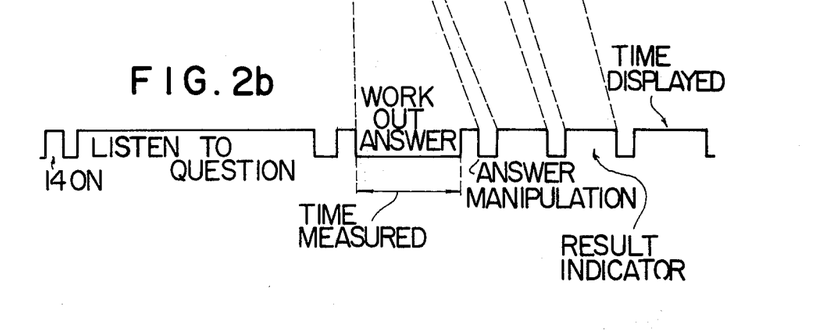
Figure 7:
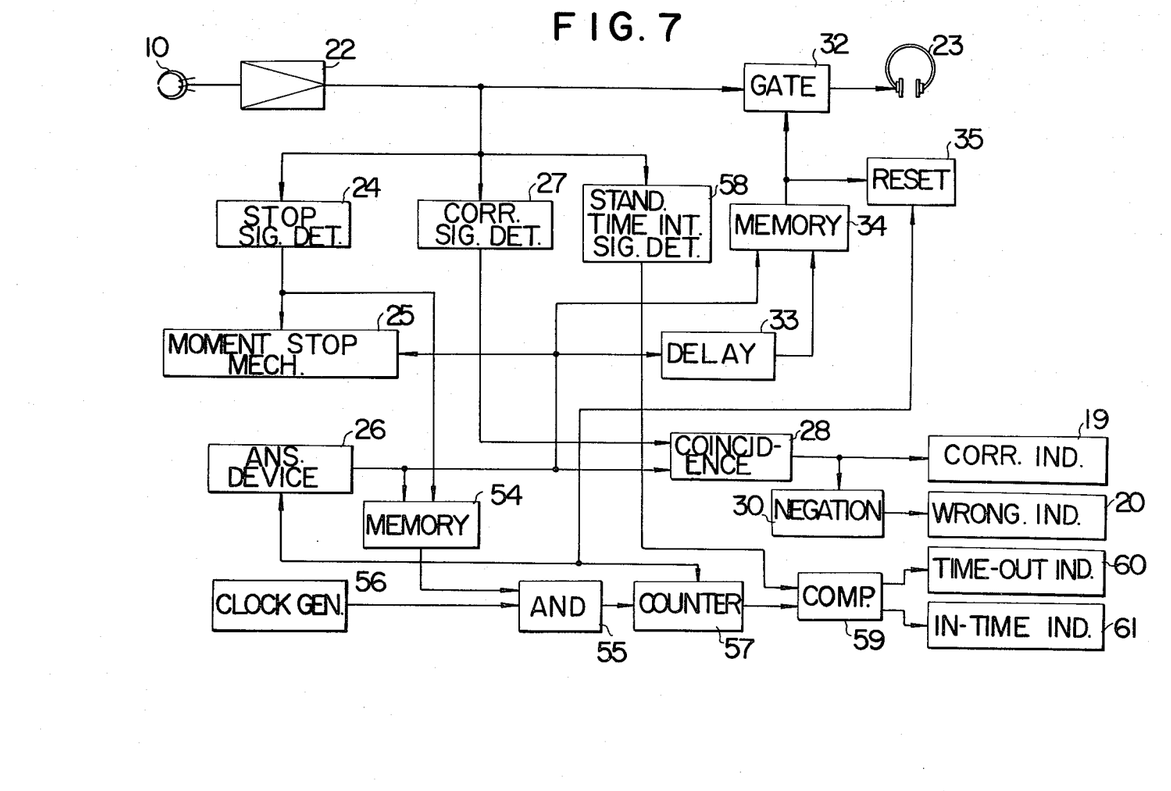
FIG. 7 is a schematic diagram showing another embodiment of the invention.

FIG. 7 shows another embodiment of the invention which is adapted to provide an indication of the response time required for a student to work out an answer to the question presented. Referring to FIGS. 2 and 7, the recording track 2 of the magnetic sheet 1 has recorded thereon a plurality of teaching subjects in sequence as before, and each teaching subject comprises a set of a question signal A, a stop signal B, a correct answer signal C for the question signal A, a standard time interval signal E permitted to submit an answer to the question signal A, and an explanation signal D for the question signal A. The standard time interval signal E may be recorded in a position preceding the correct answer signal C on the track 2 or at the same position therewith. In the example shown, the signal E is recorded as a digital signal using a high frequency region on the order of 2000 Hz, for example. The question signal A recorded on the magnetic sheet is detected by the magnetic head 10 within the magnetic play-back unit 4, amplified by the amplifier 22, and applied through the gate circuit 32 to the head receiver 23 for conversion into a sound. When the stop signal is detected by the magnetic head 10 from the magnetic sheet 1, it is amplified by the amplifier 22 and is detected by the stop signal detector 24, the output signal of which is applied to the momentary stop mechanism 25 which is operative to stop the play-back operation within the magnetic play-back unit 4. The output signal of the stop signal detector 24 is also applied to a memory circuit 54 to set it. The output signal from the memory circuit 54 is applied to an AND circuit 55, the other input of which is connected to be supplied with a clock pulse having a fixed period from a clock pulse generator 56, the clock pulse being passed through the AND circuit 55 to be applied to a counter 57. The counter 57 counts the clock pulses applied thereto to determine the length of time elapsed after the stop signal has been detected. A student endeavours at obtaining an answer to the question presented, and when he manipulates the answer device 26, an answer signal is produced therefrom. As in the previous embodiments, the answer signal resumes the play-back operation, whereby a correct answer signal C is detached from the recording track 2 and compared with the answer signal to provide an indication whether the answer is correct or wrong. The answer signal also resets the memory circuit 54. The magnetic head 10 detects from the recording track 2 a standard time interval signal E, which is amplified by the amplifier 22 and is detected by a standard time interval signal detector 58. The output signal of the detector 58 is applied to a comparator 59 together with the output signal of the counter 57 for the purpose of comparison. The output signal of the comparator 59 is applied to a time-out indicator 60 and in-time indicator 61. When the period of time required to work out an answer is less than the standard time interval, it is indicated by the in-time indicator 61, while when the length of time required to work out an answer exceeds the standard time interval, this is indicated by the time-out indicator 60. The remaining portion of the circuit shown operates in the same manner as mentioned previously, and therefore will not be described.

It should be understood that the explanation signal included in the embodiments described above may not be necessary and that the indicator may comprise a buzzer to provide an acoustical indication instead of lamps providing a visual indication.

What is claimed is:

1. A teaching system comprising means for providing an answer manipulation, a recording medium, reproducing means for detecting a audio signal from the recording medium on which are recorded a plurality of sets of signals, each set including a question signal, a stop signal a standard time interval signal and a correct answer signal, said reproducing means converting said audio signal into a sound and causing reproducing to be interrupted when the stop signal is detected from the recording medium, said reproducing means resuming reproducing in response to an answer manipulation, and comparison and indication means for comparing the correct answer signal detected from the recording medium after the reproducing means has resumed reproducing with an answer produced by said answer manipulation and for indicating the result of the comparison, further including time indication means for determining the length of time from the interruption of the operation of the reproducing means which occurs in response to the stop signal until an answer manipulation is made and for indicating the result of comparision of such length of time with the standard time interval detected from the recording medium.

2. A teaching system according to claim 1 in which the recording medium comprises a magnetic recording medium, and the reproducing means includes a magnetic head which detects the signals recorded on the magnetic recording medium.

3. A teaching system comprising: a recording medium means for sequentially reproducing sets of signals recorded on the recording medium, each set comprising sequentially a question signal, a stop signal and a correct answer signal and further comprising a standard time interval;

means for stopping reproducing of said signals by the reproducing means upon the reproducing of a stop signal following a question signal;

manually operable means for providing a selected answer signal upon a selected manual operation thereof;

means for resuming reproducing by the reproducing means upon the providing of said selected anser signal to thereby reproduce a correct answer signal;

means for comparing the provided selected answer signal with the reproduced correct answer signal to obtain a comparison result;

means for indicating the comparison result;

means for measuring the time interval from the time the stopping means stops the reproducing means until the selected answer signal is provided by the manually operable means;

means for comparing the measured interval with the standard time interval; and means for indicating which of the measured and the standard interval is longer than the other.

4. A teaching system as in claim 3 wherein the recording medium is a magnetic recording medium and the reproducing means include a magnetic reading head for reproducing said signals from the magnetic recording medium.

5. A teaching system as in claim 3 wherein: the manually operable means has a first position in which it provides said selected answer signal and a second position in which it does not provide a selected answer signal, and the teaching machine includes means for restoring the manually operable means to its first position a fixed time interval after the reproducing means is stopped by the stopping means.

6. A teaching system as in claim 3 wherein the comparing means comprises means for providing a correct comparison result signal when the two compared signals are the same and for providing a wrong comparison result when the two compared signals are not the same, and wherein the means for indicating comprises a correct answer indicator actuated in response to a correct result signal and a wrong answer indicator actuated in response to the absence of a correct result signal.

7. A teaching system as in claim 3 including a delay means having a fixed delay period and responsive to stopping the reproducing means by the stopping means to inititate its delay period and to reset, at the end of its delay period, the manually operable means to a state in which the manually operable means does not provide a selected answer signal.

8. A teaching system as in claim 3 wherein the means for measuring the time interval from stopping the reproducing means to the selected answer comprises a source of clock pulses, a counter for clock pulses, and means for gating the clock pulses to the counter to be counted therein from the time the stopping means stops the reproducing means until the time the manually operable means provides said selected answer signal, to thereby measure the time a student takes to answer a question.

* * * * *